United States Patent
Gonda

[19]
[11] Patent Number: 6,051,912
[45] Date of Patent: Apr. 18, 2000

[54] VIBRATION ACTUATOR

[75] Inventor: Tunemi Gonda, Yamato, Japan

[73] Assignee: Nikon Corporation, Tokyo, Japan

[21] Appl. No.: 09/028,924

[22] Filed: Feb. 24, 1998

[30] Foreign Application Priority Data

Feb. 24, 1997 [JP] Japan .................................. 9-038905

[51] Int. Cl.[7] .................................................. H02N 2/00
[52] U.S. Cl. ...................................................... 310/323.02
[58] Field of Search .................................... 310/323, 328, 310/323.01, 323.02, 323.16

[56] References Cited

U.S. PATENT DOCUMENTS

| | | | |
|---|---|---|---|
| 2,502,970 | 4/1950 | Manning | 310/365 |
| 2,657,320 | 10/1953 | Ziegler | 310/365 |
| 2,963,597 | 12/1960 | Gerber | 310/365 |
| 4,469,976 | 9/1984 | Scott | 310/365 |
| 4,666,315 | 5/1987 | Scranton | 384/1 |
| 5,039,899 | 8/1991 | Yamaguchi | 310/323 |
| 5,101,132 | 3/1992 | Yamaguchi | 310/323 |
| 5,136,200 | 8/1992 | Takizawa et al. | 310/323 |
| 5,140,215 | 8/1992 | Yamaguchi | 310/323 |
| 5,191,688 | 3/1993 | Takizawa et al. | 310/323 |
| 5,200,665 | 4/1993 | Iijima | 310/323 |
| 5,416,375 | 5/1995 | Funakubo et al. | 310/323 |
| 5,665,918 | 9/1997 | Takano et al. | 310/323 |
| 5,672,930 | 9/1997 | Narisawa et al. | 310/323 |

FOREIGN PATENT DOCUMENTS

| | | | |
|---|---|---|---|
| 63-277477 | 11/1988 | Japan | H02N 2/00 |
| 63-288483 | 11/1988 | Japan | 310/323.06 |
| 1-308172 | 12/1989 | Japan | 310/365 |
| 6-106028 | 12/1994 | Japan | 310/328 |
| 7-143770 | 6/1995 | Japan | H02N 2/00 |
| 7-143771 | 6/1995 | Japan | H02N 2/00 |
| 63-209480 | 8/1998 | Japan | 310/323.06 |

OTHER PUBLICATIONS

"Piezoelectric Linear Motors for Application to Driving a Light Pick–Up Element", Yoshiro Tomikawa, et al., Yamagata University, 4–3–16 Johnan, Yonezawa, Yamagata, pp. 393–398, Jun. 1993 (w/translation).

"Ultrasonic Motors Theory and Applications", S. Ueha, et al., Oxford University Press, 1993, pp. 131–135 and 191–196, Jan. 1993.

"Ultrasonic Motor—New Edition", pp. 145–147, Dec. 20, 1991, ISBN 4–88657–132–8 (w/partial translation).

U.S. application No. 08/377,466, Hickey, filed Jan. 24, 1995 Research Foundation of State U.

U.S. application No. 08/595,450, Takagi, filed Feb. 5, 1996 Nikon Corporation.

*Primary Examiner*—Thomas M. Dougherty

[57] ABSTRACT

A vibration actuator harmoniously generates both longitudinal and bending vibrations to thereby induce motion in a relative moving member. The vibration actuator improves drive efficiency and reduces soldering defects by providing an improved mounting between an electrical energy delivery member and electrodes. The elastic member is connected to an electro-mechanical converting element to convert electrical energy into mechanical displacement. The electrodes are disposed on the electro-mechanical converting element in a location approximately at a node of vibration on the elastic member. A plurality of electrically conductive sections are disposed between the plurality of thermal energy non-conducting sections and about the electrodes. The thermal energy non-conducting sections reduce damage to the electro-mechanical converting elements during the soldering process while the electrically conductive sections electrically connect each electrode to a respective electro-mechanical converting element.

11 Claims, 4 Drawing Sheets

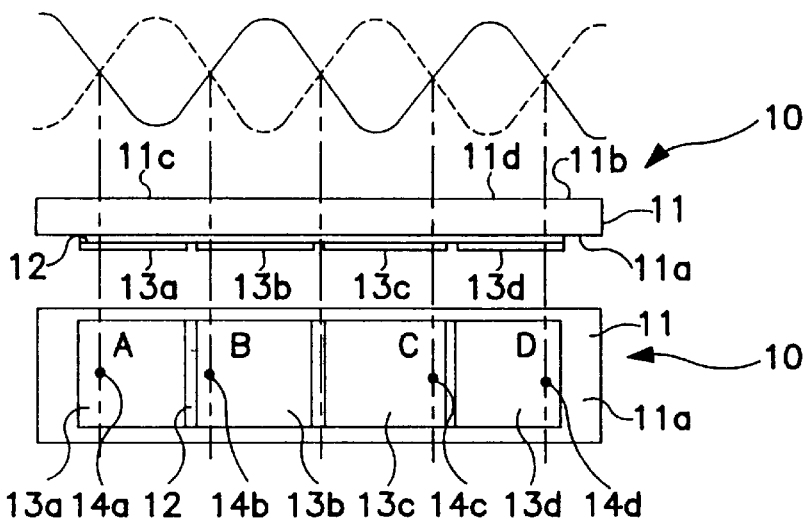
FIG. 1A
FIG. 1B
FIG. 1C
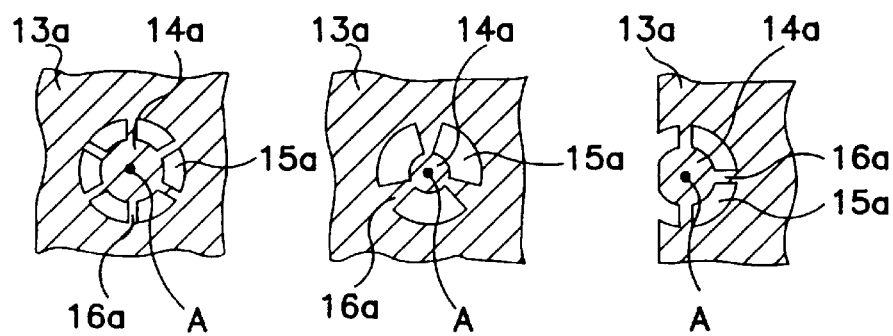
FIG. 2A    FIG. 2B    FIG. 2C

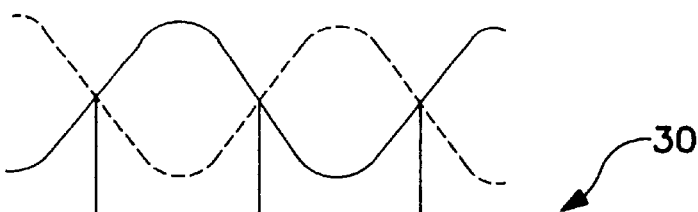
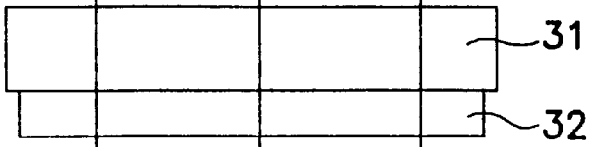
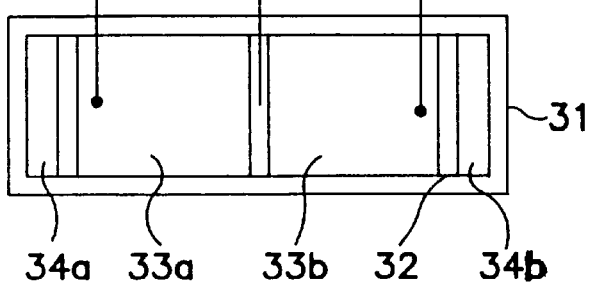
FIG. 7A
FIG. 7B
FIG. 7C
FIG. 7
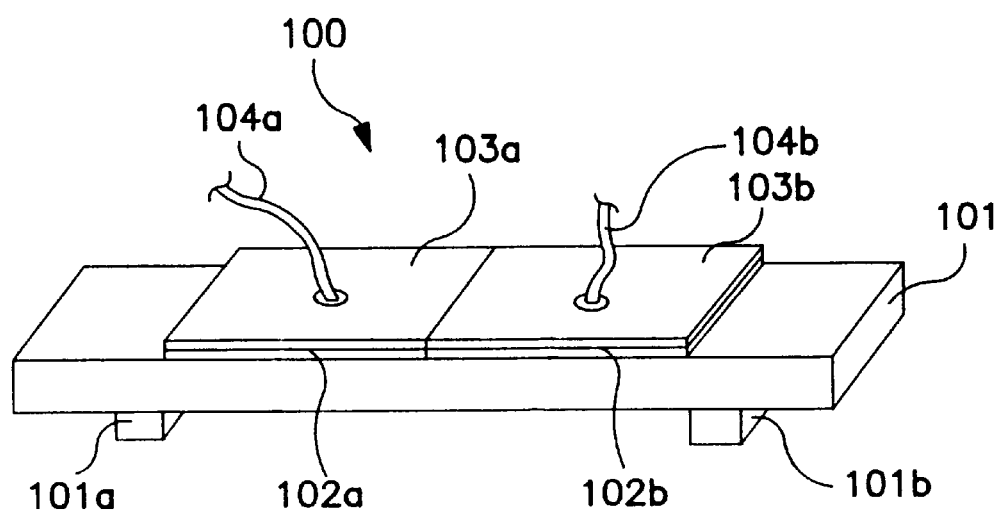
FIG. 8
PRIOR ART 6,051,912

VIBRATION ACTUATOR

INCORPORATION BY REFERENCE

The following material is herein incorporated by reference: 222 Piezoelectric Linear Motors for Application to Driving a Light Pick-Up Element, by Tomikawa et al., 5th Symposium on Dynamics Related to Electromagnetic Force, collected Papers, pages 393–398, Jun. 9–11, 1993; Japanese Laid-Open Patent Application No. 7-143770; U.S. patent application Ser. No. 08/377,466 (which is based on JP 7-143770).

CROSS-REFERENCE TO RELATED APPLICATIONS

This application is based upon and claims priority of Japanese Patent Application No. 9-038905, filed Feb. 24, 1997, the contents being incorporated herein by reference.

BACKGROUND OF THE INVENTION

The present invention relates to vibration actuators including electro-mechanical conversion elements that convert electrical energy into mechanical displacements. More particularly, the present invention relates to vibration actuators which reduce dampening of vibration due to particular placement of lead wires for electro-mechanical converting elements.

Vibration actuators generate elliptical motion on the surface of an elastic member by applying a drive signal to an electro-mechanical converting element, which is generally in the form of a piezoelectric member and attached to the elastic member. The electro-mechanical converting element harmoniously generates both a longitudinal vibration and a bending vibration. The vibration actuator then generates relative motion between the elastic member and a relative moving member that has been pressed against the elastic member during the above elliptical motion.

As for this type of vibration actuator, the analytical results are delineated, in detail, regarding the configuration and load characteristics thereof in "Piezoelectric Linear Motors for Application to Driving a Light Pick-Up Element," by Yoshiro Tomikawa, et al., 5th Symposium on Dynamics Related to Electromagnetic Force, Collected papers, pages 393–398. A self-propelled apparatus using this vibration actuator is also disclosed in "New Edition—Ultrasonic Motors" by Ueba and Tomikawa, published by Tricheps, pages 145–146.

FIG. 8 is an elevated perspective view of a conventional vibration actuator 100. As illustrated, thin plate-like piezoelectric members 102a and 102b, that are made of lead zirconate titanate ("PZT"), are adhered onto one of the planes of a rectangular, flat, plate-like elastic member 101. Piezoelectric members 102a and 102b generate a linear, longitudinal vibration, as well as biquadratic bending vibration, that expands and contracts in a longitudinal direction, i.e. along the longer sides of elastic member 101, in response to applied driving voltages. Driving force output members 101a and 101b are formed as projections at two of six locations of anti-nodes for the biquadratic bending vibration generated on elastic member 101. An elliptical motion, which is a synthesis of the longitudinal and bending vibrations, occurs on the end surfaces of driving force output members 101a and 101b.

A relative moving member (i.e. a moving element), not shown in FIG. 8, makes contact by being pressed with the end surfaces of driving force output members 101a and 101b. Subsequently, a relative motion is generated between elastic element 101 and the relative moving member in response to the above elliptical motion.

Vibration actuator 100 is designed such that the characteristic frequencies of the longitudinal vibration and the bending vibration that respectively occur on elastic member 101 attain extremely similar values. Consequently, by applying an A/C voltage that has a frequency similar to the two characteristic frequencies to piezoelectric members 102a and 102b, both a longitudinal vibration and a bending vibration may be generated harmoniously. This produces a relative motion between elastic member 101 and the relative moving member.

In vibration actuator 100, electrode 103a and electrode 103b are attached onto the surface of piezoelectric member 102a and piezoelectric member 102b, respectively. Electrical energy delivery members (lead wires) 104a and 104b are connected to a drive voltage generator and are soldered onto electrodes 103a and 103b. Subsequently, a drive voltage is applied to piezoelectric member 102a through lead wire 104a while a drive voltage is also applied to piezoelectric member 102b through lead wire 104b.

However, the locations of lead wires 104a and 104b with respect to electrodes 103a and 103b may vary depending upon the installation configuration of vibration actuator 100 and therefore the locations are not particularly specified. Moreover, as the soldering process is usually a manual operation, the locations of the soldering points may not be consistent. As a result, there is a problem of attenuation, i.e. reduction, of the bending vibration occurring on elastic member 101 depending upon the location of the soldering, thereby decreasing the drive efficiency of vibration actuator 100.

Additionally, there may be a problem of inconsistent soldering levels due to procedural discrepancies during the soldering process.

BRIEF SUMMARY OF THE INVENTION

It is therefore an object of the present invention to solve the above-mentioned problems including the particular problem of a decrease in the driving efficiency of the vibration actuator caused by inconsistent mounting of an electrical energy delivery member to an electro-mechanical converting element.

It is a further object of the present invention to provide a vibration actuator that is capable of preventing soldering defects by improving execution of the mounting process of an electrical energy delivery member.

It is a further object of the present invention to provide a press member that generates pressure between a vibration element and a relative moving member through a grounding member during relative motion.

Objects of the present invention are achieved by a vibration actuator, including an elastic member connected to an electro-mechanical converting element to convert electrical energy into mechanical displacement, thereby generating vibration in said elastic member; an electrode disposed on said electro-mechanical converting element; and a connecting section disposed on said electrode to receive generated electrical energy outside of the vibration actuator, wherein a location of said connecting section is approximately at a node of vibration on said elastic member.

Further objects of the present invention are achieved by a vibration actuator, including an elastic member; an electro-mechanical converting element connected to said elastic member to generate vibration; an electrode disposed on said electro-mechanical converting element; and a connecting section disposed on said electrode and located approximately at a node of the vibration.

Even further objects of the present invention are achieved by a vibration actuator, including an elastic member; an electro-mechanical converting element connected to said elastic member to generate vibration; an electrode disposed on said electro-mechanical converting element; a connecting section disposed on said electrode approximately at a node of said vibration; a plurality of thermal energy non-conductive sections radially disposed about said connecting section; and a plurality of electrically conductive sections disposed between said plurality of thermal energy non-conductive sections, thereby electrically connecting said connecting section to said electrode.

Additionally, objects of the present invention are achieved by a vibration actuator, including an elastic member; an electro-mechanical converting element connected to said elastic member to generate vibration; an electrode disposed on said electro-mechanical converting element approximately at a node of the vibration; a plurality of thermal energy non-conducting sections radially disposed about said electrode; and a plurality of electrically conductive sections disposed between said plurality of thermal energy non-conducting sections, thereby electrically connecting said electrode to said electro-mechanical converting element.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIG. 1A is a schematic diagram illustrating a biquadratic bending vibration of an elastic member of FIG. 1B according to a preferred embodiment of the present invention. FIG. 1B is an elevated side view of the elastic member according to a preferred embodiment of the present invention. FIG. 1C is an elevated top view of the elastic member of FIG. 1B.

FIGS. 2A–2C are elevated top views of a vibration actuator attached to electrodes according to a preferred embodiment of the present invention.

FIG. 7A is a schematic diagram illustrating a biquadratic bending vibration of an elastic member of FIG. 7B according to a preferred embodiment of the present invention. FIG. 7B is an elevated side view of the elastic member according to a preferred embodiment of the present invention. FIG. 7C is an elevated top view of the elastic member of FIG. 7B.

FIG. 8 is an elevated perspective view of a conventional vibration actuator.

DETAILED DESCRIPTION OF THE PREFERRED EMBODIMENTS

Figure 3:
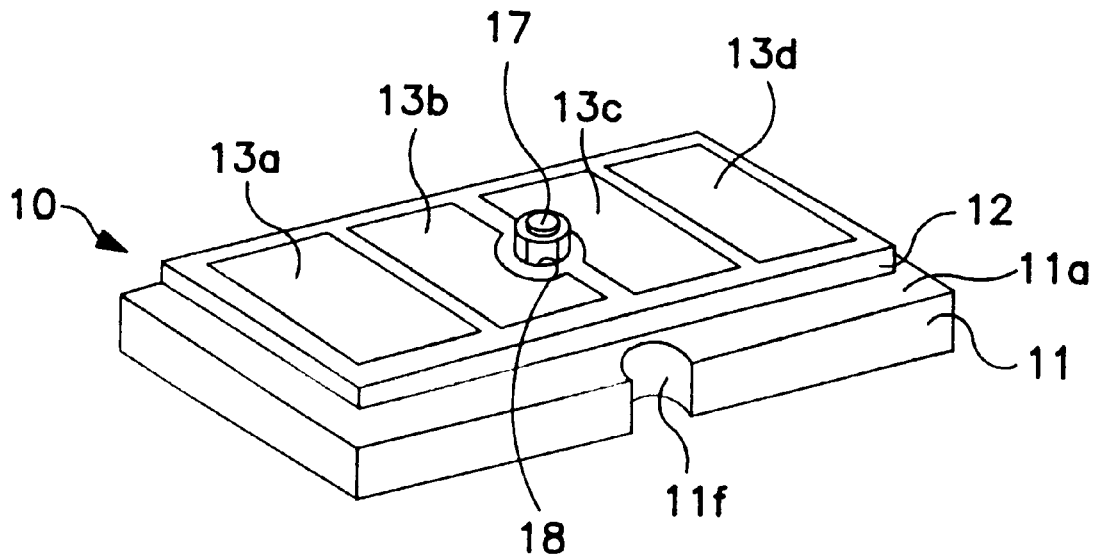
FIG. 3 is an elevated perspective view of a grounded vibration actuator according to a preferred embodiment of the present invention.

Reference will now be made in detail to the preferred embodiments of the present invention, examples of which are illustrated in the accompanying drawings, wherein like reference numerals refer to like elements throughout.

Explanations of the following embodiments of a vibration actuator are provided by way of example to an ultrasonic actuator that uses an ultrasonic vibration range. The configuration of an ultrasonic vibration actuator is disclosed, for example, in the above "222 Piezoelectric Linear, Flat Plate Motors for Application to Driving a Light Pick-Up Element", 5th Symposium on Dynamics Related to Electromagnetic Force, Collected Papers, and Japanese Laid-Open Patent Publication No. 7-143770.

FIGS. 1A–1C illustrate biquadratic vibration on an elastic member 11 and piezoelectric member 12 according to a preferred embodiment of the present invention. Piezoelectric member 12 is an electro-mechanical converting element.

As illustrated, vibration actuator 10 is a ultrasonic actuator using degenerate vibration modes of different form, wherein linear, longitudinal, a biquadratic, and bending vibrations harmoniously occur on elastic member 11.

Vibration actuator 10 includes elastic member 11, which is formed in a rectangular, flat plate configuration using an elastic material such as metal or plastic. Piezoelectric member 12 is adhered to flat plane 11a of elastic member 11 using, for example, an adhesive. Piezoelectric member 12 is preferably made of lead zirconate titanate ("PZT") and is formed in a thin, rectangular, plate-like configuration.

Two anti-node locations 11c and 11d, among six locations for the anti-nodes of generated biquadratic bending vibrations, and located on a second flat plane 11b of elastic member 11, function as driving force output members to transfer a driving force to a relative moving member (not shown) in compressive contact therewith.

As illustrated in FIGS. 1B and 1C, independent, rectangular electrodes 13a, 13b, 13c, and 13d are preferably formed through a screen printing process onto a surface of piezoelectric member 12. An A/C voltage "X" is applied to electrodes 13a and 13c. Furthermore, an A/C voltage "Y" having a phase approximately $\pi/2$ different from A/C voltage X is applied to electrodes 13b and 13d. It is also acceptable to provide electrodes 13a, 13b, 13c, and 13d as separate members which are affixed to piezoelectric member 12 with an adhesive, instead of the screen printing process. Moreover, according to another embodiment of the present invention, the phase difference between the A/C voltage X and the A/C voltage Y is not limited to $\pi/2$.

Piezoelectric member 12 excites elastic member 11 as A/C voltage X and A/C voltage Y are applied to electrodes 13a and 13c, and electrodes 13b and 13d, respectively. Subsequently, a biquadratic bending vibration is generated on elastic member 11, as indicated by the illustrated vibration waveform in FIG. 1A. Additionally, a linear, expansion and contraction vibration (i.e. longitudinal vibration) is generated on elastic member 11 with the nodes located in a central section in a length-wise direction along elastic member 11.

Due to the generation of the above bending and longitudinal vibrations, an elliptical motion occurs on driving force output members 11c and 11d that are formed on the second flat plane 11b of elastic member 11.

Lead wires (not shown), which are electrical energy delivery members, are soldered to solder locations A, B, C, and D of the surface of electrodes 13a–13d. In this preferred embodiment, solder locations A-D are the centers of lead wire connecting sections 14a–14d, which approximately correspond to the locations of nodes in the biquadratic bending vibration on elastic member 11.

By soldering the lead wires at solder locations A-D, a dampening of vibration caused through mounting of the lead wires can be minimized. Solder locations A, B, C, and D may correspond to the locations of the nodes in the biquadratic bending vibration occurring on elastic member 11 instead of the central positions in lead wire connecting sections 14a–14d. Further, solder locations A, B, C, and D may be a place where the amplitude of the biquadratic bending vibration is within 1/20 of the maximum amplitude of the biquadratic bending vibration occurring on elastic member 11.

FIGS. 2A, 2B, and 2C are elevated top views depicting an example for lead wire connecting sections 14a–14d where the lead wires are attached to electrodes 13a–13d on vibration actuator 10. As the shapes of the lead wire connecting sections 14a–14d are identical in this preferred embodiment, an explanation is provided by referring to lead wire connecting section 14a at location A on electrode 13a as an example.

As particularly illustrated in FIGS. 2A–2C, lead wire connecting section 14a is formed in a round shape. Soldering is performed while maintaining an end of the lead wire in contact with lead wire connecting section 14a. As a result, the soldering position does not shift during connection, thereby enabling the precise execution of soldering at a designated location.

A thermal energy non-conductive section 15a is preferably formed around each lead wire connecting section 14a. Thermal energy non-conductive section 15a is formed, for example, as an opening created by the above screen printing process. Lead wire connecting section 14a is connected to electrode 13a by electrically conductive section 16a that is formed radially about lead wire connecting section 14a. Thermal energy non-conductive section 15a may be formed by, for example, an etching process.

FIG. 2A illustrates an example having six electrically conductive sections 16a, as well as six thermal energy non-conductive sections 15a partitioned by the electrically conductive sections 16a. FIG. 2B illustrates an example having three electrically conductive sections 16a, as well as three thermal energy non-conductive sections 15a partitioned by the respective electrically conductive sections 16a. FIG. 2C illustrates an example of three electrically conductive sections 16a, as well as three thermal energy non-conductive sections 15a and lead wire connecting section 14a, all formed near the edge of electrode 13a. As illustrated, an electrical energy supply portion is a connecting section where electrical energy flows in the electrodes.

According to the above configurations, it is possible to substantially control the conduction of thermal energy applied between thermal energy non-conductive sections 15a and electrode 13a during the soldering process. Additionally, as lead wire connecting section 14a has a small configuration, the heat capacity of this connecting section is low.

When a lead wire is connected to lead wire connecting section 14a, the lead wire connecting section 14a (itself having a low heat capacity) is heated. A corresponding temperature of the lead wire connecting section 14a increases to the soldering temperature in a short period of time. This is due to the quantity of heat received during the soldering process. Moreover, as the thermal energy non-conductive section 15a is provided around lead wire connecting section 14a, only the quantity of heat transferred through the electrically conductive section 16a is provided to electrode 13a. Of course, electrode 13a itself does not require independent heating. Consequently, the temperature increase at electrode 13a is substantially restricted and deterioration of piezoelectric member 12 is prevented.

In lieu of the provision of thermal energy non-conductive section 15a, another preferred embodiment provides a section having a lower conductivity rate of thermal energy than electrically conductive section 16a. In this case, it is also possible to control an amount of temperature increase at electrode 13a.

The temperature of lead wire connecting section 14a easily and assuredly increases to the specified soldering temperature during soldering. Therefore, the soldering process is assuredly executed, thereby solving the problem of soldering failure. As a result, it is possible to control a decrease in the driving efficiency of the vibration actuator 10 caused by the soldering process.

Figures 4A, 4B:
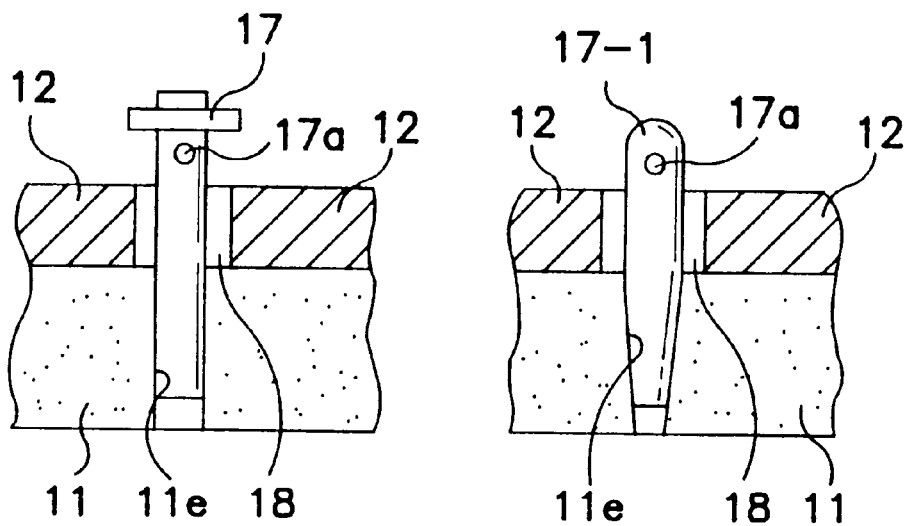
FIG. 4A is a cross sectional view of a grounding area of an elastic member according to a preferred embodiment of the present invention.
FIG. 4B is a cross sectional view of a grounding area of an elastic member according to another preferred embodiment of the present invention.

FIG. 3 is an elevated perspective view of vibration actuator 10 including a grounded elastic member 11. FIG. 4A is a cross sectional view of a grounding area of elastic member 11 according to a preferred embodiment of the present invention. FIG. 4B is a cross sectional view of a grounding area of elastic member 11 according to another preferred embodiment of the present invention. In FIGS. 4A and 4B, electrodes 13a–13d are not shown. In the subsequent figures lead wire connecting sections 14a–14c are not shown in order to simplify the explanation of the configuration.

As illustrated in FIG. 3 and FIG. 4A, penetrating hole 11e is formed through a central section of elastic member 11 in a thickness direction. Ground pin 17 is inserted into penetrating hole 11e. At this point, it is also acceptable to fasten ground pin 17 by placing a tap at penetrating hole 11e and providing a threaded section in a lower part of ground pin 17 for insertion. Penetrating hole 17a is provided about a head of ground pin 17 in order to connect a grounding lead wire. Instead of providing a separate penetrating hole 17a, the grounding lead wire may be directly connected on the surface of the head of ground pin 17.

As illustrated in FIG. 3, a pair of semi-circle shaped concave sections are created at the edges of electrodes 13b and 13c about ground pin 17. In addition, as illustrated in FIGS. 3, 4A and 4B, an opening 18 is maintained between piezoelectric member 12 and ground pin 17. Consequently, contact between piezoelectric member 12 and ground pin 17 is prevented and ground pin 17 is conductive only through elastic member 11.

With reference to FIG. 4B, it is also possible to use ground pin 17-1 in lieu of ground pin 17. Ground pin 17-1 is tapered in an area to be inserted into elastic member 11 in order to snugly fit with tapered penetrating hole 11e-1.

As illustrated in FIG. 3 a groove 11f is provided about a central section of a long side of elastic member 11. A second groove 11g (shown in FIG. 6) is also provided about a central section of a second long side of elastic member 11 opposite to groove 11f. Each of the grooves preferably has a semi-circle cross sectional shape passing through a thickness direction of elastic member 11.

Figure 5:
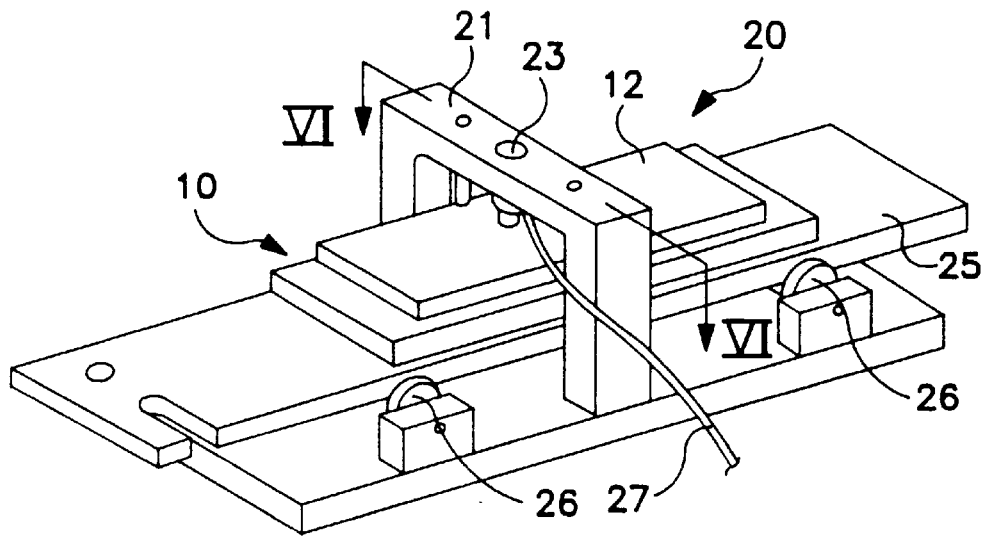
FIG. 5 is an elevated perspective view of a transfer device including a relative moving member and the vibration actuator illustrated in FIG. 3 or FIG. 4A.
Figure 6:
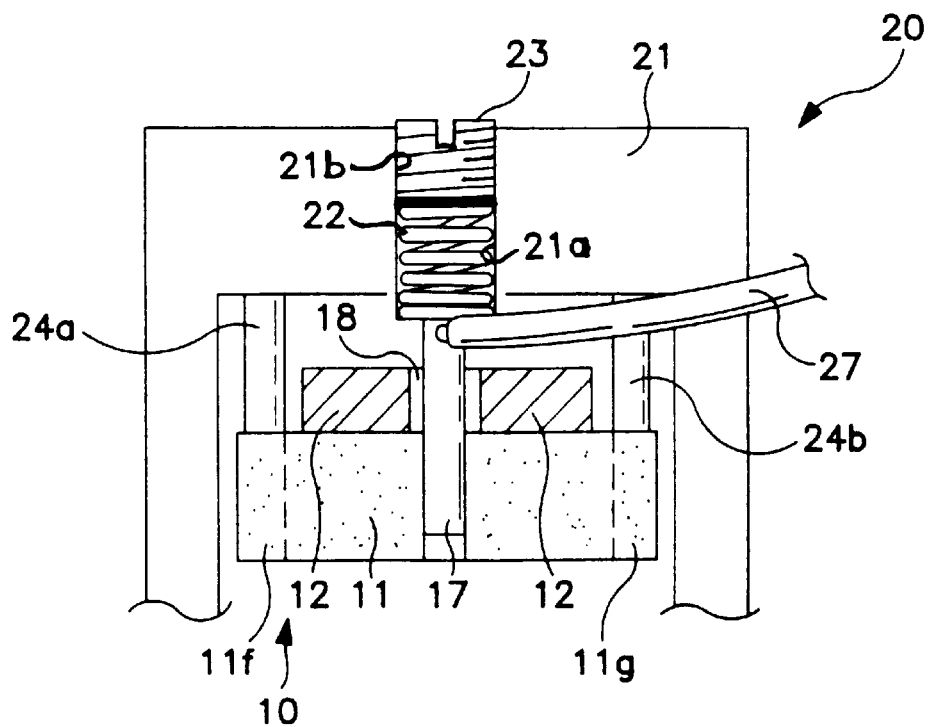
FIG. 6 is a cross sectional view taken along line VI—VI of FIG. 5.

FIG. 5 is an elevated perspective view of a transfer device 20 including relative moving member 25 in cooperation with the vibration actuator 10 of FIGS. 3 and 4A. Likewise, FIG. 6 is a cross sectional view taken along line VI—VI of FIG. 5. Electrodes 13a–13d are omitted in FIGS. 5 and 6.

With reference to FIG. 6, the position of elastic member 11 is restricted from movement in a lateral direction by a support pin 24a inserted into groove 11f and a support pin 24b inserted into groove 11g. Support pins 24a and 24b are supported by being fastened to the ceiling of frame 21 covering elastic member 11. Coil spring 22 is mounted as a press member inside penetrating hole 21*a* of frame 21. Screw 23, which adjusts the spring force of coil spring 22, is also fastened to frame 21 by way of insertion into screw portion 21*b* inside penetrating hole 21*a*. The spring force is regulated by adjusting the fastening location of screw 23.

Coil spring 22 makes contact with the head formed on the upper portion of ground pin 17. This head also functions as a spring washer for coil spring 22, thereby contributing to a reduction of the numbers of parts. Vibration actuator 10 is pressed against relative moving member 25, which is a board-like member, by coil spring 22. The bottom of relative moving member 25 is supported by transfer rollers 26. Subsequently during operation, relative moving member 25 is transferred in a longitudinal direction by vibration actuator 10.

Pressure between vibration actuator 10 and relative moving member 25 may be regulated by screw 23 as set forth above. As illustrated, grounding lead wire 27 is mounted through penetrating hole 17*a* (see FIG. 4A) in ground pin 17.

In lieu of coil spring 22, other spring members such as a board spring, or a plate spring, may be used according to additional preferred embodiments of the present invention.

In the above preferred embodiments, a vibration actuator performs as an ultrasonic actuator while using an ultrasonic vibration range. However, the vibration actuator relating to the present invention is not limited to this style. It is equally applicable to vibration actuators using other vibration ranges.

Likewise, in the above preferred embodiments, a piezoelectric member is preferably used as an electro-mechanical converting element. However, the vibration actuator relating to the present invention is not limited to this style and other types of electro-mechanical converting elements which are capable of converting electrical energy into mechanical displacement may be used. For example, an electrostriction element or magnetostriction element may be used.

Moreover, with regard to the shape of lead wire connecting sections, various modifications may be adopted as long as a non-conductive section for the thermal energy is present. These modifications are also deemed to be included in the range of embodiments of the present invention.

Furthermore, as set forth above, preferred embodiments of a vibration actuator in the form of an ultrasonic actuator (commonly referred to as an "L1B4 mode" vibration actuator) that generates a linear, longitudinal vibration and a biquadratic bending vibration on an elastic member have been provided as examples. However, the vibration actuator of the present invention is not limited to this style. The novel features and advantages of the present invention are equally applicable to ultrasonic actuators that use other vibration modes.

FIG. 7A is a schematic diagram illustrating a biquadratic bending vibration of an elastic member of FIG. 7B, according to a preferred embodiment of the present invention. FIG. 7B is an elevated side view of the elastic member according to a preferred embodiment of the present invention. FIG. 7C is an elevated top view of the elastic member of FIG. 7B. As illustrated, vibration actuator 30, including piezoelectric member 32, is mounted onto one plane of a rectangular, flat, plate-like, elastic member 31. Vibration generating electrodes 33*a* and 33*b*, as well as vibration detecting piezoelectric members 34*a* and 34*b*, are mounted at specified locations on the surface of piezoelectric member 32. This type of vibration actuator 30 is known as an "L2B2 mode" that generates a linear, longitudinal vibration and secondary bending vibration on elastic member 31. Further, a detailed explanation is omitted regarding this type of vibration actuator 30, as it is available through the above Collected Papers from "5th Symposium on Dynamics Related to Electromagnetic Force."

The novel concepts of the present invention may be applied to vibration actuators that gain their driving force through other modes.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A vibration actuator, comprising:
   an elastic member connected to an electro-mechanical converting element to convert electrical energy into mechanical displacement, thereby generating vibration in said elastic member;
   a plurality of electrodes disposed on the electro-mechanical converting element such that the electro-mechanical converting element is supplied with the electrical energy through said electrodes;
   a plurality of connecting sections respectively disposed on said plurality of electrodes to receive generated electrical energy outside of the vibration actuator;
   a driving force output member disposed on said elastic member to transfer a driving force to a relative moving member; and
   an electrical energy supply member connected to one of said connecting sections to thereby supply the generated electrical energy from outside of the vibration actuator to the electro-mechanical converting element,
   wherein respective locations of said connecting sections are approximately at respective nodes of vibration on said elastic member, and
   a low conductivity portion having a lower thermal energy conductive rate than said one connecting section is formed in an adjacent position to said one connecting section, and said one low conductivity portion includes an opening defined with respect to a portion of one of said electrodes.

2. The vibration actuator according to claim 1, wherein the elastic member generates at least a bending vibration, and said one connecting section is located approximately at a node of the bending vibration.

3. A vibration actuator, comprising:
   an elastic member connected to an electro-mechanical converting element to convert electrical energy into mechanical displacement, thereby generating vibration in said elastic member, said elastic member being configured as a rectangular parallelepiped and said electro-mechanical converting element being connected onto a specified plane of said elastic member;
   a plurality of electrodes disposed on the electro-mechanical converting element;
   a plurality of connecting sections respectively disposed on said plurality of electrodes to receive generated electrical energy outside of the vibration actuator;
   a driving force output member disposed on said elastic member to transfer a driving force to a relative moving member; and
   a ground member connected to and grounding said elastic member, wherein respective locations of said connecting sections are approximately at respective nodes of vibration on said elastic member, and wherein the electro-mechanical converting element has a penetrating hole and said ground member is inserted into the hole without contacting the electro-mechanical converting element.

4. The vibration actuator according to claim 3, further comprising:

a press member to generate pressure between said elastic member and a relative moving member, wherein said press member activates the pressure through said ground member.

5. A vibration actuator, comprising:

an elastic member;

an electro-mechanical converting element connected to said elastic member to generate vibration;

a plurality of electrodes disposed on said electro-mechanical converting element;

a plurality of connecting sections disposed on corresponding electrodes of said plurality of electrodes and located approximately at respective nodes of the vibration; and a plurality of thermal energy non-conducting sections each defined by respective openings in corresponding electrodes, and each being radially disposed about respective connecting sections.

6. The vibration actuator according to claim 5, further comprising:

an electrical energy supply member connected to and supplying energy to one of said connecting sections.

7. The vibration actuator according to claim 5, wherein a plurality of electrically conductive sections are disposed between said plurality of thermal energy non-conducting sections, thereby forming a plurality of electrically conductive pathways between each respective connecting section and respective surrounding portions of each respective thermal energy non-conducting section.

8. The vibration actuator according to claim 5, wherein said elastic member generates at least a bending vibration, and said connecting sections are respectively located approximately at respective nodes of the bending vibration.

9. A vibration actuator, comprising:

an elastic member being configured as a rectangular parallelepiped;

an electro-mechanical converting element connected to a specified plane of said elastic member to generate vibration;

a plurality of electrodes disposed on said electro-mechanical converting element;

a plurality of connecting sections disposed on corresponding electrodes of said plurality of electrodes and located approximately at respective nodes of the vibration; and a ground member connected to and grounding said elastic member, wherein said electro-mechanical converting element has a penetrating hole and said ground member is inserted into the hole without contacting said electro-mechanical converting element.

10. The vibration actuator according to claim 9, said elastic member being configured as a rectangular parallelepiped and said electro-mechanical converting element being connected onto a specified plane of said elastic member.

11. A vibration actuator, comprising:

elastic member means;

means for elastically vibrating said elastic member means in response to a mechanical displacement;

means for generating the mechanical displacement in response to an electrical signal; and means for supplying the electrical signal to said means for generating the mechanical displacement approximately at nodes of the vibration, wherein said means for supplying the electrical signal has a connecting section for receiving the electrical signal and a thermal energy preventing portion surrounding the corresponding connecting section.

* * * * *

UNITED STATES PATENT AND TRADEMARK OFFICE
CERTIFICATE OF CORRECTION

PATENT NO.: 6,051,912
DATED : April 18, 2000
INVENTOR(S): Tunemi GONDA

It is certified that error appears in the above-identified patent and that said Letters Patent is hereby corrected as shown below:

Column 9 &10, line 42, please ADD claims 15 and 16:

--15. A vibration actuator, comprising:
an elastic member;
an electro-mechanical converting element connected to said elastic member to generate vibration;
a plurality of electrodes disposed on said electro-mechanical converting element;
a plurality of connecting sections disposed on corresponding electrodes approximately at respective nodes of said vibration;
a plurality of thermal energy non-conductive sections each defining an opening on respective electrodes and each radially disposed about respective connecting sections; and
a plurality of electrically conductive sections disposed between said plurality of thermal energy non-conductive sections, thereby electrically connecting each of said electrodes with a corresponding connecting section--;

Signed and Sealed this

Eighth Day of May, 2001

*Attest:*

NICHOLAS P. GODICI

*Attesting Officer*  Acting Director of the United States Patent and Trademark Office